United States Patent
Wilkinson et al.

(10) Patent No.: US 10,693,405 B2
(45) Date of Patent: Jun. 23, 2020

(54) PERMANENT MAGNET GENERATOR WITH MAGNETIC ROTOR BAND

(71) Applicant: Hamilton Sundstrand Corporation, Charlotte, NC (US)

(72) Inventors: Andrew R. Wilkinson, Cherrry Valley, IL (US); Dhaval Patel, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 174 days.

(21) Appl. No.: 15/862,877

(22) Filed: Jan. 5, 2018

(65) Prior Publication Data
US 2019/0214929 A1    Jul. 11, 2019

(51) Int. Cl.
| | | |
|---|---|---|
| H02P 21/18 | (2016.01) |
| H02K 1/27 | (2006.01) |
| H02K 11/00 | (2016.01) |
| H02K 11/225 | (2016.01) |
| F02B 63/04 | (2006.01) |
| H02K 1/24 | (2006.01) |
| H02K 3/28 | (2006.01) |
| H02K 7/18 | (2006.01) |
| H02K 16/04 | (2006.01) |
| H02K 21/48 | (2006.01) |
| H02K 29/06 | (2006.01) |

(52) U.S. Cl.
CPC ............ *H02P 21/18* (2016.02); *F02B 63/042* (2013.01); *H02K 1/246* (2013.01); *H02K 1/278* (2013.01); *H02K 1/2786* (2013.01); *H02K 3/28* (2013.01); *H02K 7/1823* (2013.01); *H02K 11/225* (2016.01); *H02K 16/04* (2013.01); *H02K 21/48* (2013.01); *H02K 29/06* (2013.01)

(58) Field of Classification Search
CPC ...... H02P 21/18; H02K 11/225; H02K 1/246; H02K 1/2786; H02K 3/28; H02K 7/1823; H02K 16/04; H02K 21/48; H02K 29/06; H02K 1/278; H02K 11/215; F02B 63/042
USPC ........................................................ 310/68 B
See application file for complete search history.

(56) References Cited

U.S. PATENT DOCUMENTS

| | | | |
|---|---|---|---|
| 5,920,248 A | * | 7/1999 | Travostino ............. G01D 5/142 324/207.25 |
| 6,967,461 B1 | | 11/2005 | Markunas et al. |
| 7,583,046 B2 | | 9/2009 | Maddali et al. |
| 8,324,851 B2 | | 12/2012 | Matsuo et al. |

(Continued)

FOREIGN PATENT DOCUMENTS

| | | |
|---|---|---|
| DE | 102013018277 A1 | 4/2015 |
| WO | 2017126694 A1 | 7/2017 |

OTHER PUBLICATIONS

Extended European Search Report dated May 17, 2019, received for corresponding European Application No. 18248255.4.

*Primary Examiner* — Thomas Truong
(74) *Attorney, Agent, or Firm* — Kinney & Lange, P.A.

(57) ABSTRACT

A rotor of a generator includes a plurality of permanent magnets and at least one magnetic band. The plurality of permanent magnets is arranged about an axis such that magnetic poles of the plurality of permanent magnets are radially oriented in regard to the rotor. The at least one magnetic band is disposed on a surface of the rotor such that magnetic poles of the magnetic band are between 1 degree and 90 degrees from being axially oriented in regard to the rotor.

19 Claims, 5 Drawing Sheets

(56) References Cited

U.S. PATENT DOCUMENTS

| | | | |
|---|---|---|---|
| 8,362,728 B2 | 1/2013 | Patel et al. | |
| 8,593,095 B2 | 11/2013 | Markunas et al. | |
| 9,543,876 B2 | 1/2017 | Patel et al. | |
| 2012/0181119 A1* | 7/2012 | Korhonen | H02K 11/215 187/394 |
| 2013/0169099 A1* | 7/2013 | Saban | H02K 1/278 310/156.12 |

* cited by examiner

PERMANENT MAGNET GENERATOR WITH MAGNETIC ROTOR BAND

BACKGROUND

Wound field synchronous machines are commonly used for electromechanical power transfer systems. Wound field synchronous machines may serve as both a starter/motor and generator when coupled to a variable speed prime mover, such as a gas turbine engine. The variable speed prime mover is mechanically coupled to a main generator and an exciter. The rotor of the main generator is coupled to the rotor of a permanent magnet generator. For proper function of wound field synchronous machines it is important to have a way to determine the angular position of the main generator rotor. Monitoring the position of the main generator rotor can be done by sensing the angular position of the permanent magnet generator rotor as it is coupled to the permanent magnet generator rotor. One method for determining the angular position of the rotor uses carrier injection sensorless stimulation signals. This method requires persistent excitation of the permanent magnet generator. Additionally, the permanent magnet generator needs to have saliency which limits the rotor design and capability.

SUMMARY

In one example, a rotor of a generator comprises a plurality of permanent magnets and at least one magnetic band. The plurality of permanent magnets is arranged about the axis such that magnetic poles of the plurality of permanent magnets are radially oriented in regard to the rotor. The at least one magnetic band is disposed on a surface of the rotor such that magnetic poles of the magnetic band are between 1 degree and 90 degrees from being axially oriented in regard to the rotor.

In one example, a rotor angular position detection system comprises a permanent magnet generator and a controller. The permanent magnet generator is configured to provide a modulated voltage signal. The permanent magnet generator comprises a stator and a rotor. The stator includes one or more stator windings. The rotor is configured to be rotatable about an axis and induce a current in the stator windings when rotating. The rotor comprises a plurality of permanent magnets and at least one magnetic band. The plurality of permanent magnets is arranged about the axis such that magnetic poles of the plurality of permanent magnets are radially oriented in regard to the rotor. The at least one magnetic band is disposed on a surface of the rotor such that magnetic poles of the magnetic band are between 1 degree and 90 degrees from being axially oriented in regard to the rotor. The controller is electrically coupled to the permanent magnet generator. The controller is configured to determine an angular position of the rotor based upon the modulated voltage signal.

In one example, a method comprises receiving a modulated voltage signal from a permanent magnet generator; demodulating the voltage signal to extract a position signal using demodulation circuitry; and determining an angular position of a rotor of the permanent magnet generator based upon the position signal using a controller.

DETAILED DESCRIPTION

Apparatus, systems, and associated methods relate to rotor position sensing. A rotor has a magnetic band disposed on a surface of the rotor such that the magnetic field of the magnetic band is oriented substantially axially. The axially oriented magnetic field modulates the voltage of power generated by a generator providing power using the rotor with the magnetic band. The modulated voltage can be demodulated to determine the angular position of the rotor. Using the apparatus, systems, and associated methods herein, allows for determining the angular position of the rotor without using persistent excitation and a salient rotor. Therefore, rotor design can be optimized for producing power.

Figure 1:
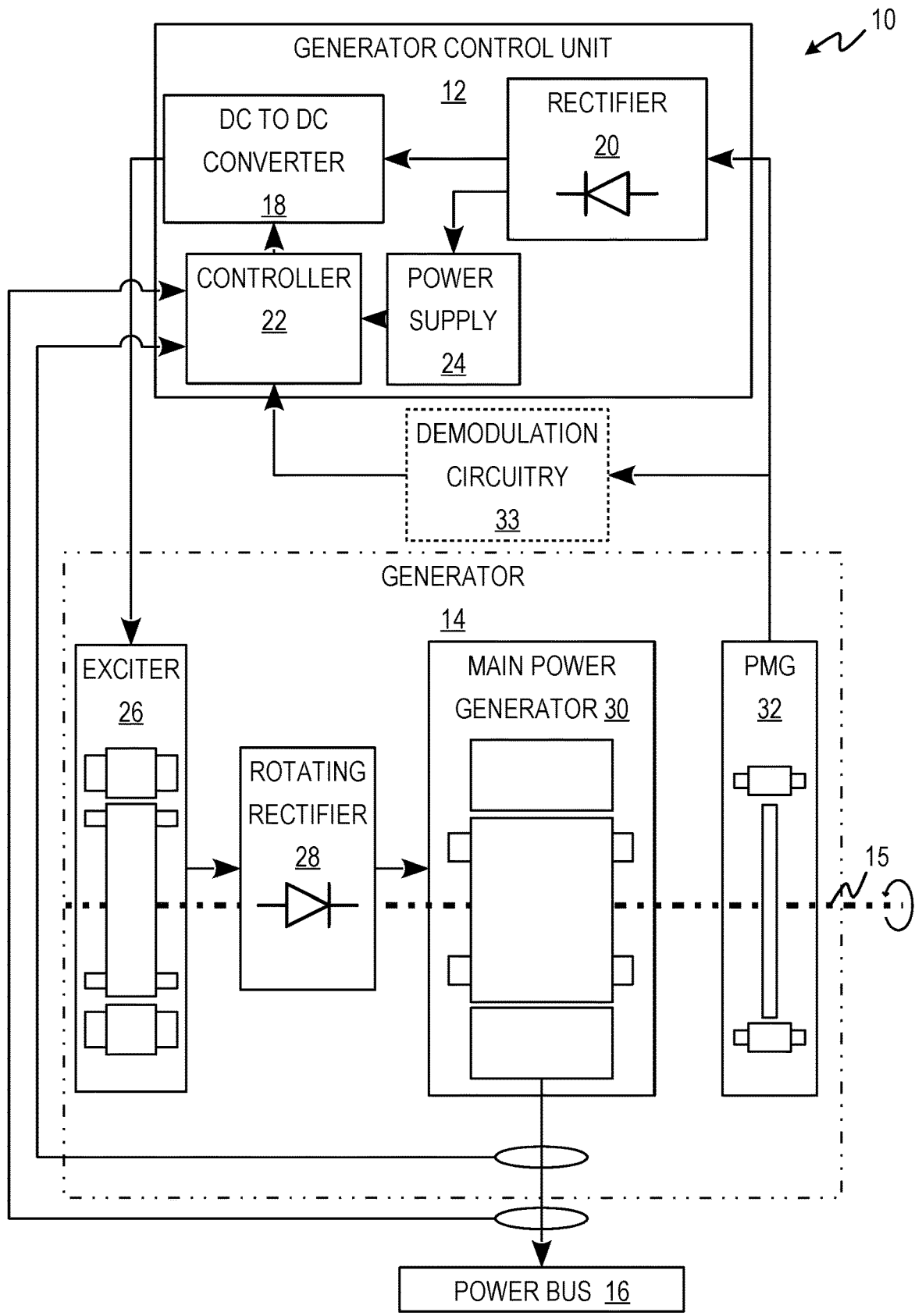
FIG. 1 is a block diagram of a wound field synchronous machine system.

FIG. 1 is a block diagram of wound field synchronous machine system 10 including generator control unit 12, generator 14, rotor shaft 15, and power bus 16. Generator control unit 12 includes direct current (DC) to DC converter 18, rectifier 20, controller 22, and power supply 24. Generator 14 includes exciter 26, rotating rectifier 28, main power generator 30, and permanent magnet generator 32. Wound field synchronous machine system 10 optionally includes demodulation device 33.

Rotor shaft 15 is connected to a variable speed prime mover, which causes rotor shaft 15 to spin. In one example, the variable speed prime mover is a gas turbine engine. Rotor shaft 15 is mechanically coupled to the rotors of exciter 26, main power generator 30, and permanent magnet generator 32 causing them to spin. Rotor shaft 15 is also mechanically coupled to rotating rectifier 28. The rotor of permanent magnet generator 32 includes a magnetic band disposed on a surface of the rotor such that the magnetic pole of the magnetic band is oriented in a substantially axial direction. The spinning of permanent magnet generator 32 generates alternating current (AC) power, which is provided to generator control unit 12. The magnetic field of the magnetic band modulates the voltage of the AC power generated by permanent magnet generator 32. By modulating the voltage of the AC power generated by permanent magnet generator 32, the magnetic band provides a position signal, using the voltage of the AC power as a carrier wave. The position signal indicates the angular position of the rotor of permanent magnet generator 32.

In one example, controller 22 receives the modulated voltage signal of the AC power and demodulates it to determine the angular position of the rotor of permanent magnet generator 32. In a further example, the modulated voltage signal is provided to demodulation device 33. Demodulation device 33 is configured to demodulate the voltage signal and provide the position signal to controller 22. Controller 22 is configured to determine the angular position of the rotor of permanent magnet generator 32 based upon the position signal.

Rectifier 20 receives the AC power provided by permanent magnet generator 32 and converts it to DC power, which, is then supplied to DC to DC converter 18 and power supply 24. Power supply 24 conditions the power for controller 22. Controller 22 controls DC to DC converter 18 to provide a control current to exciter 26. Exciter 26 provides an AC power to rotating rectifier 28. The AC power provided by exciter 26 is determined by the control current provided by generator control unit 12. Rotating rectifier 28 converts the AC power provided by exciter 26 to a DC current. Rotating rectifier 28 provides DC current to the windings of main power generator 30. The output voltage of the main power generator 30 is controlled by the DC current from exciter 26 and the speed of the windings of main power generator 30. Main power generator 30 provides power to power bus 16 when main power generator 30 is electrically coupled to power bus 16.

Figure 2A:
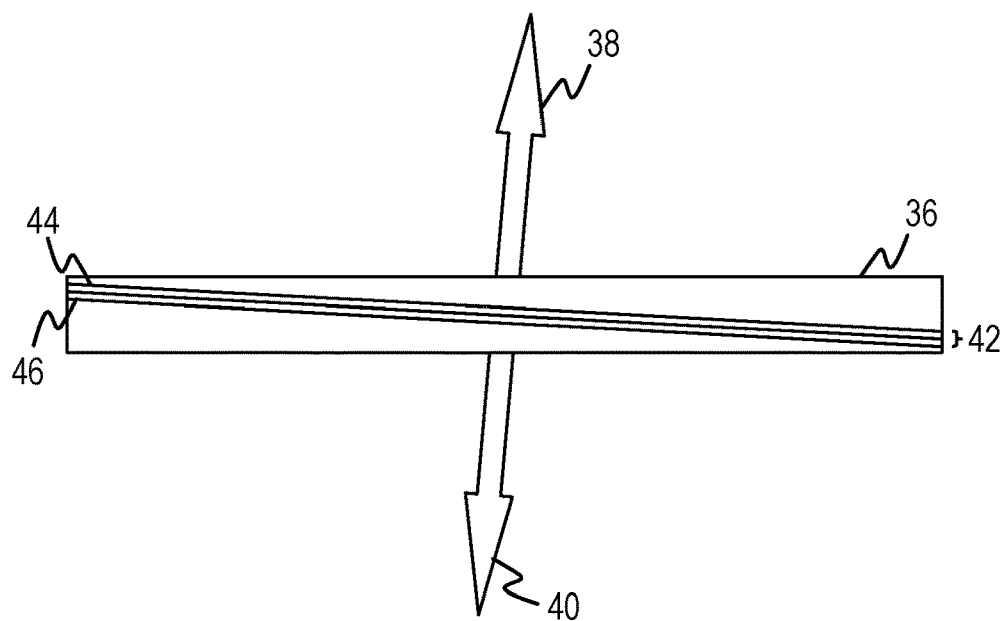
FIG. 2A is a side view of a rotor with a magnetic band disposed on its outer surface.

FIG. 2A is a diagram of a side view of rotor 36 of permanent magnet generator 32 including north magnetic pole 38 and south magnetic pole 40. Rotor 36 includes magnetic band 42 disposed on its outer surface. Magnetic band 42 includes north magnetic region 44 and south magnetic region 46, encompassing a single pole pair.

As shown in FIG. 2A, magnetic band 42 is disposed on an outer circumferential surface of rotor 36 at an angle relative to the axis of rotor 36. North magnetic pole 38 and south magnetic pole 40 can be oriented between 1 degree and 90 degrees from being axially oriented. This is caused by magnetic band 42 being disposed at an angle relative to the axis of rotor 36. In one example, magnetic band 42 is substantially closer to a circular side of rotor 36 at a first circumferential point of rotor 36 than at a second circumferential point of rotor 36, the second point antipodal to the first point. In a further example, magnetic band 42 is continuous. In another example, magnetic band 42 is substantially closer to a circular side of rotor 36 at a first circumferential point of rotor 36 than at a second circumferential point of rotor 36, the second point adjacent to the first point such that magnetic band 42 is discontinuous. In one example, magnetic band 42 is part of a cylinder encompassing the circumferential surface. The cylinder is composed of magnetic material and non-magnetic material. The magnetic material comprises magnetic band 42. The non-magnetic material comprises the rest of the cylinder. In a further example, two or more bands are disposed on an outer circumferential surface of rotor 36.

Figure 2B:
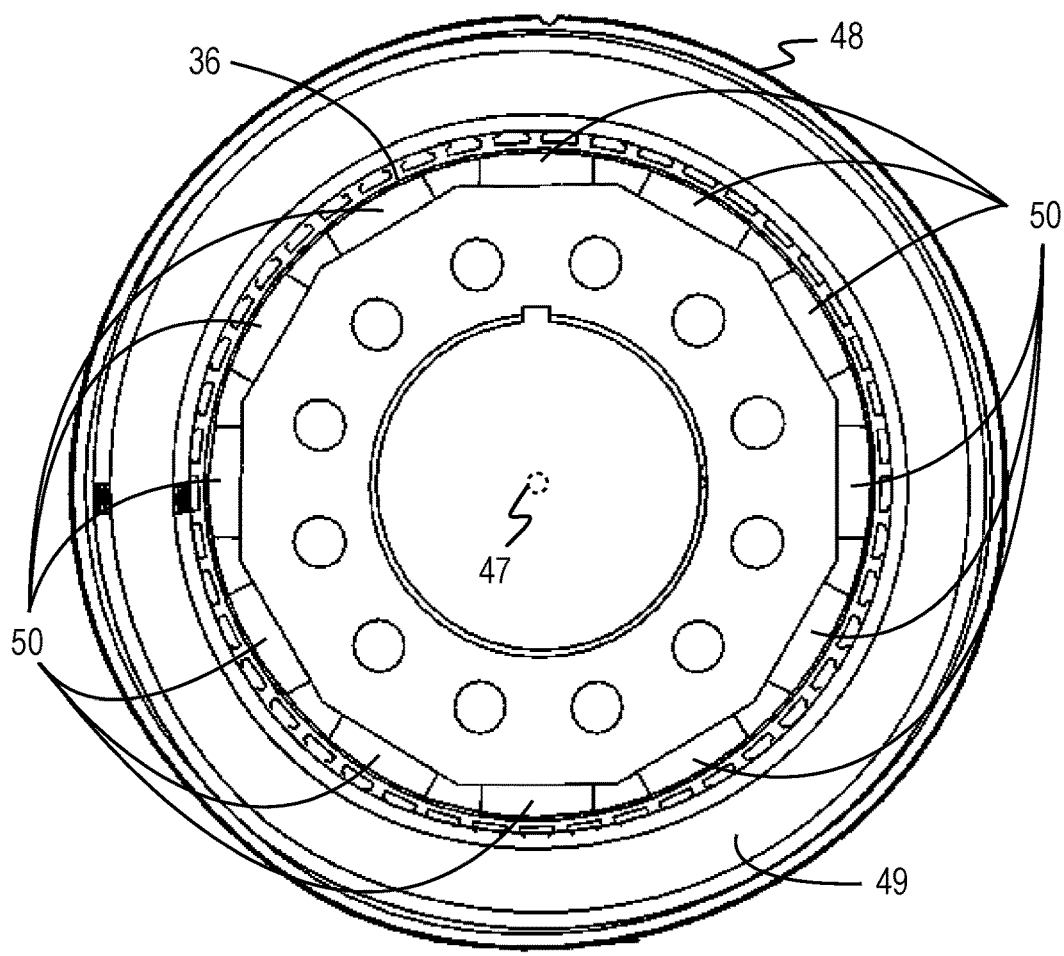
FIG. 2B is a top view of a rotor and stator.

FIG. 2B is a diagram of a top down view of rotor 36, axis 47, and stator 48. Stator 48 includes windings 49. Rotor 36 includes permanent magnets 50.

As shown in FIG. 2B, rotor 36 and stator 48 share common axis, axis 47. Rotor 36 is configured to rotate around axis 47. Permanent magnets 50 alternate the direction of their magnetic poles. This creates an alternating magnetic field projecting normally outside of rotor 36. As rotor 36 rotates around axis 47, the magnetic field created by permanent magnets 50 fluctuates, thereby inducing a voltage in windings 49.

Figure 3:
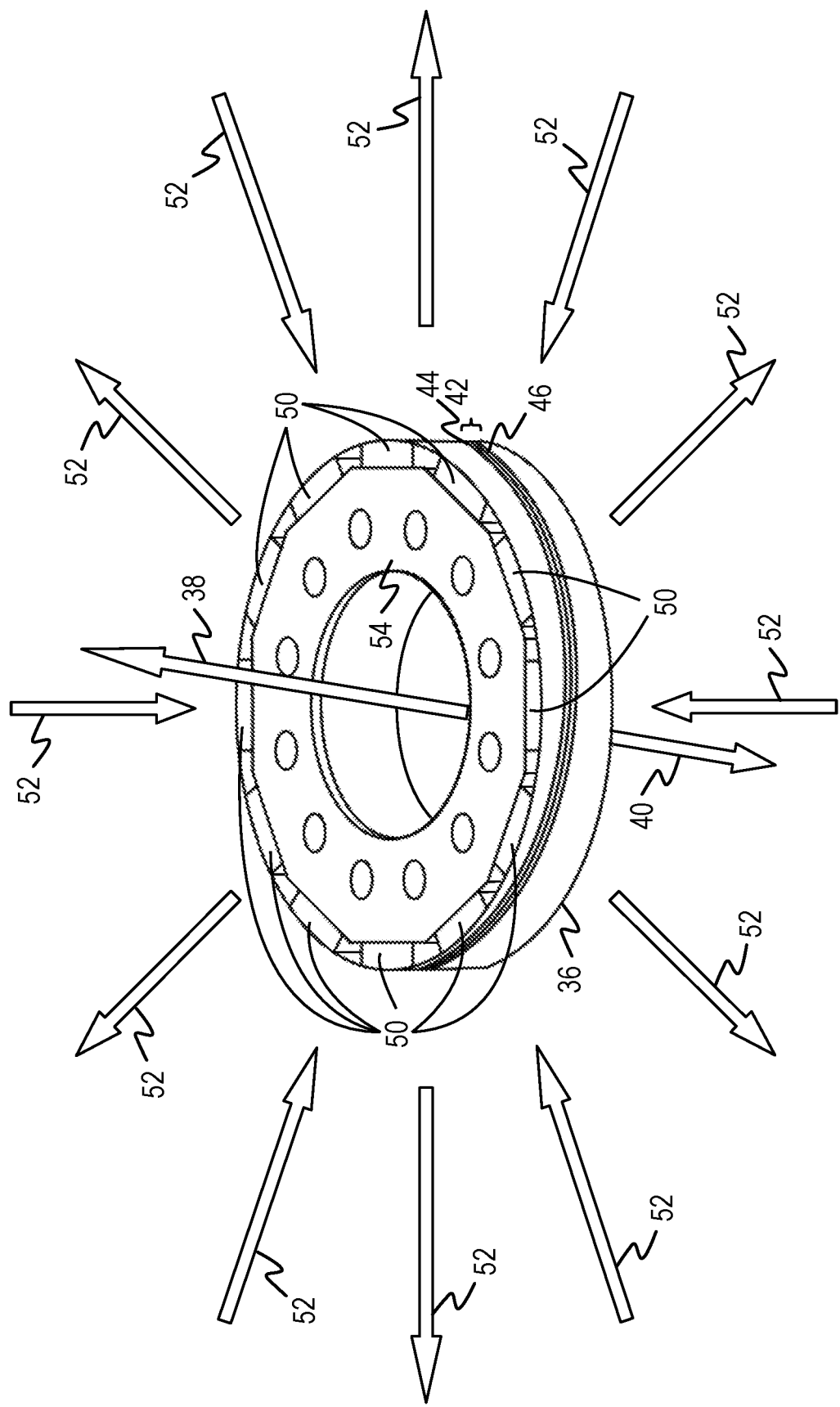
FIG. 3 is a perspective view of a rotor with a magnetic band disposed on its outer surface.

FIG. 3 is a diagram of a perspective view of rotor 36 including north magnetic pole 38, south magnetic pole 40, and magnetic orientation arrows 52. Rotor 36 includes magnetic band 42 disposed on its outer surface and permanent magnets 50. Magnetic band 42 includes north magnetic region 44 and south magnetic region 46.

Magnetic orientation arrows 52 indicate the orientation of the magnetic fields created by permanent magnets 50. Magnetic orientation arrows 52 are arranged normally to the radial plane of rotor 36. Magnetic orientation arrows 52 alternate direction because permanent magnets 50 are arranged with their magnetic poles in alternate directions. The tilt of north magnetic pole 38 and south magnetic pole 40 skews the radially oriented magnetic field provided by permanent magnets 50. The skew of the radially oriented magnetic field modulates the voltage of the AC power provided by a generator that rotor 36 is used in, such as permanent magnet generator 32. The modulation corresponds to an angular position of rotor 36, thus angular position of rotor 36 can be determined from the modulated voltage signal. In one example, the magnetic energy product of magnetic band 42 is greater than the magnetic energy product of each of the individual permanent magnets 50. The greater magnetic energy product of magnetic band 42 provides a greater modulation of the modulated voltage signal of permanent magnet generator 32.

Figure 4:
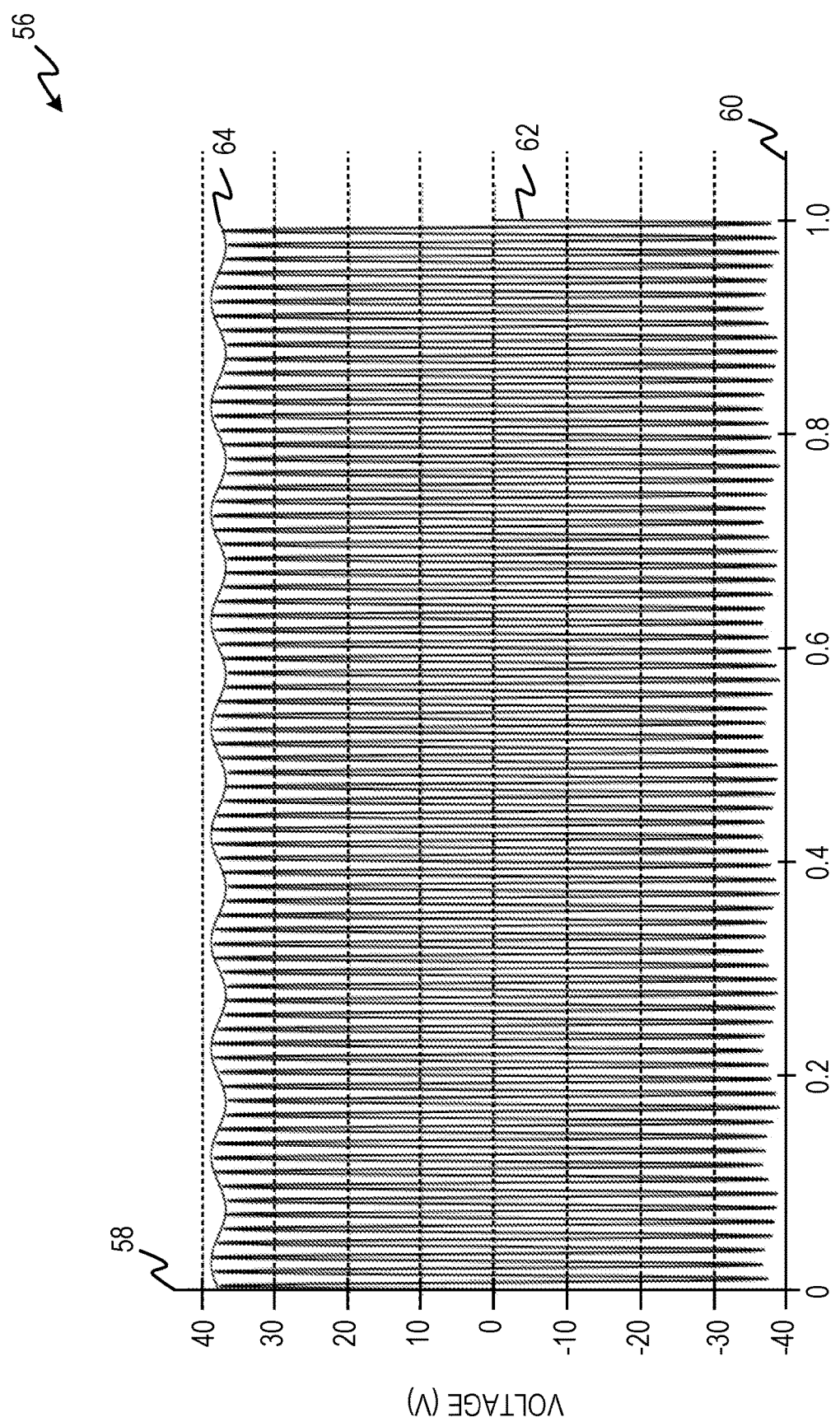
FIG. 4 is a graph illustrating the voltage modulation of the power generated by the rotor with a magnetic band.

FIG. 4 is a graph including y-axis 58, x-axis 60, AC voltage curve 62 and encoded position signal curve 64.

Y-axis 58 represents the magnitude of the sinusoidal voltage, in volts. X-axis 60 represents time in seconds. AC voltage curve 62 represents the voltage signal of the AC power provided by permanent magnet generator 32 of FIG. 1. AC voltage curve 62 is modulated by magnetic band 42, thereby providing an encoded position signal shown by encoded position signal curve 64. The modulation caused by magnetic band 42 is amplitude modulation, thus encoded position signal curve 64 is determined by the sinusoidal amplitude variations of AC voltage curve 62. Controller 22 and/or demodulation device 33 (FIG. 1) is configured to demodulate AC voltage curve 62 providing a position signal substantially similar to encoded position signal curve 64. Once demodulated, the position signal is used to determine the angular position of rotor 36 of permanent magnet generator 32.

Figure 5:
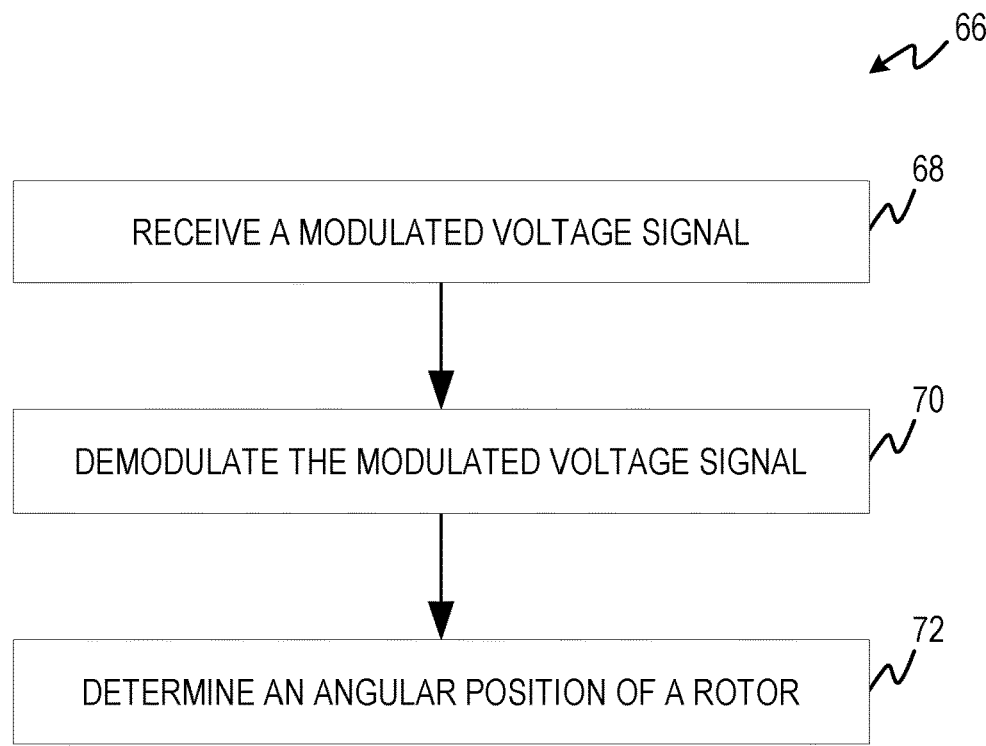
FIG. 5 is a flow diagram depicting a process for determining an angular position of a rotor with a magnetic band.

FIG. 5 is a flow diagram depicting process 66 for determining an angular position of a rotor with a magnetic band. For purposes of clarity and ease of discussion, the example angular position determination is described below within the context of wound field synchronous machine system 10 of FIG. 1.

At step 68, a modulated voltage is received from permanent magnet generator 32. At step 70, the voltage signal from permanent magnet generator 32 is demodulated to extract a position signal using demodulation circuitry 33. Demodulating the voltage signal can include rectifying, filtering, product detection, and/or synchronous detection. In one example, demodulation of the voltage signal is done by the controller. At step 72, the angular position of rotor 36 of permanent magnet generator 32 is determined based upon the position signal.

Accordingly, implementing techniques of this disclosure, generator rotors described herein, allow for determining the angular position of the rotor without persistent excitation. The magnetic band of the rotor modulates the voltage of the AC power generated by permanent magnet generators. The modulated voltage is then demodulated to extract the position signal. The position signal is used to determine the angular position of the rotor. By using a rotor with a magnetic band as described herein, permanent magnet generators can be optimized for producing power rather than designing for permanent excitation.

Discussion of Possible Embodiments

The following are non-exclusive descriptions of possible embodiments of the present invention.

A rotor of a generator can comprise a plurality of permanent magnets arranged about an axis such that magnetic poles of the plurality of permanent magnets are radially oriented in regard to the rotor; and at least one magnetic band disposed on a surface of the rotor such that magnetic poles of the magnetic band are between 1 degree and 90 degrees from being axially oriented in regard to the rotor.

The rotor of the preceding paragraph can optionally include, additionally and/or alternatively, any one or more of the following features, configurations and/or additional components:

A magnetic energy product of a magnetic field produced by the at least one magnetic band can be greater than any magnetic energy product of a magnetic field produced by any one of the plurality of permanent magnets.

The at least one magnetic band can be a continuous magnetic band.

The at least one magnetic band can be disposed on an outer circumferential surface of the rotor.

The surface of the rotor can comprise cylinder composed of magnetic material and nonmagnetic material, wherein the magnetic material of the cylinder can comprise the at least one magnetic band.

The at least one magnetic band can be closer to a circular side of the rotor at a first circumferential point of the rotor than at a second circumferential point of the rotor, the second point antipodal to the first point.

The at least one magnetic band can comprise two magnetic bands.

A rotor angular position detection system can comprise a permanent magnet generator configured to provide a modulated voltage signal, the permanent magnet generator comprising: a stator including one or more stator windings; and a rotor configured to be rotatable about an axis and induce a current in the stator windings when rotating, the rotor comprising: a plurality of permanent magnets arranged about the axis such that magnetic poles of the plurality of permanent magnets are radially oriented in regard to the rotor; and at least one magnetic band disposed on a surface of the rotor such that magnetic poles of the magnetic band are between 1 degree and 90 degrees from being axially oriented in regard to the rotor; and a controller, electrically coupled to the permanent magnet generator, configured to determine an angular position of the rotor based upon the modulated voltage signal.

The system of the preceding paragraph can optionally include, additionally and/or alternatively, any one or more of the following features, configurations and/or additional components:

The controller can be configured to demodulate the modulated voltage signal to extract a position signal and determine the angular position of the rotor based upon the position signal.

A demodulation device can be configured to demodulate the voltage signal to extract a position signal, and provide the position signal to the controller.

The demodulation device can comprise a filter.

The surface of the rotor can comprise cylinder composed of magnetic material and nonmagnetic material, wherein the magnetic material of the cylinder comprises the at least one magnetic band.

The at least one magnetic band can be closer to a circular side of the system at a first circumferential point of the system than at a second circumferential point of the system, the second point antipodal to the first point.

The at least one magnetic band can comprise one magnetic pole pair, represented by a north and south magnetic banded region.

A magnetic energy product of a magnetic field produced by the at least one magnetic band can be greater than any magnetic energy product of a magnetic field produced by any one of the plurality of permanent magnets.

The at least one magnetic band can be a continuous magnetic band.

The at least one magnetic band can be disposed on an outer circumferential surface of the rotor.

A method can comprise receiving a modulated voltage signal from a permanent magnet generator; demodulating the voltage signal to extract a position signal using demodulation circuitry; and determining an angular position of a rotor of the permanent magnet generator based upon the position signal using a controller.

The method of the preceding paragraph can optionally include, additionally and/or alternatively, any one or more of the following features, configurations and/or additional components:

Demodulating the voltage signal can include filtering the modulated voltage, and the demodulation circuitry comprises a filter.

The controller can be used to demodulate the voltage signal.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rotor of a generator comprising:
 a plurality of permanent magnets arranged about an axis such that magnetic poles of the plurality of permanent magnets are radially oriented in regard to the rotor; and
 at least one magnetic band disposed on a surface of the rotor such that magnetic poles of the magnetic band are between 1 degree and 90 degrees from being axially oriented in regard to the rotor;
 wherein a magnetic energy product of a magnetic field produced by the at least one magnetic band is greater than any magnetic energy product of a magnetic field produced by any one of the plurality of permanent magnets.

2. The rotor of claim 1, wherein the at least one magnetic band is a continuous magnetic band.

3. The rotor of claim 1, wherein the at least one magnetic band is disposed on an outer circumferential surface of the rotor.

4. The rotor of claim 1, wherein the surface of the rotor comprises a cylinder composed of magnetic material and nonmagnetic material, wherein the magnetic material of the cylinder comprises the at least one magnetic band.

5. The rotor of claim 1, wherein the at least one magnetic band is closer to a circular side of the rotor at a first circumferential point of the rotor than at a second circumferential point of the rotor, the second point antipodal to the first point.

6. The rotor of claim 1, wherein the at least one magnetic band comprises two magnetic bands.

7. A rotor angular position detection system comprising:
 a permanent magnet generator configured to provide a modulated voltage signal, the permanent magnet generator comprising:
 a stator including one or more stator windings; and a rotor configured to be rotatable about an axis and induce a current in the stator windings when rotating, the rotor comprising:
  a plurality of permanent magnets arranged about the axis such that magnetic poles of the plurality of permanent magnets are radially oriented in regard to the rotor; and
  at least one magnetic band disposed on a surface of the rotor such that magnetic poles of the magnetic band are between 1 degree and 90 degrees from being axially oriented in regard to the rotor; and
a controller, electrically coupled to the permanent magnet generator, configured to determine an angular position of the rotor based upon the modulated voltage signal.

8. The system of claim 7, wherein the controller is configured to demodulate the modulated voltage signal to extract a position signal and determine the angular position of the rotor based upon the position signal.

9. The system of claim 7, further including a demodulation device configured to demodulate the voltage signal to extract a position signal, and provide the position signal to the controller.

10. The system of claim 9, wherein the demodulation device comprises a filter.

11. The system of claim 7, wherein the surface of the rotor comprises a cylinder composed of magnetic material and nonmagnetic material, wherein the magnetic material of the cylinder comprises the at least one magnetic band.

12. The system of claim 7, wherein the at least one magnetic band is closer to a circular side of the system at a first circumferential point of the system than at a second circumferential point of the system, the second point antipodal to the first point.

13. The system of claim 7, wherein the at least one magnetic band comprises one magnetic pole pair, represented by a north and south magnetic banded region.

14. The system of claim 7, wherein a magnetic energy product of a magnetic field produced by the at least one magnetic band is greater than any magnetic energy product of a magnetic field produced by any one of the plurality of permanent magnets.

15. The system of claim 7, wherein the at least one magnetic band is a continuous magnetic band.

16. The system of claim 7, wherein the at least one magnetic band is disposed on an outer circumferential surface of the rotor.

17. A method comprising:
receiving a modulated voltage signal from a permanent magnet generator that includes a rotor, the rotor comprising:
  a plurality of permanent magnets arranged about an axis such that magnetic poles of the plurality of permanent magnets are radially oriented in regard to the rotor; and
  at least one magnetic band disposed on a surface of the rotor such that magnetic poles of the magnetic band are between 1 degree and 90 degrees from being axially oriented in regard to the rotor;
  wherein a magnetic energy product of a magnetic field produced by the at least one magnetic band is greater than any magnetic energy product of a magnetic field produced by any one of the plurality of permanent magnets;
demodulating the voltage signal to extract a position signal using demodulation circuitry; and
determining an angular position of a rotor of the permanent magnet generator based upon the position signal using a controller.

18. The method of claim 17, wherein demodulating the voltage signal includes filtering the modulated voltage, and the demodulation circuitry comprises a filter.

19. The method of claim 17, wherein the controller is used to demodulate the voltage signal.

\* \* \* \* \*